(12) United States Patent
Shotey et al.

(10) Patent No.: US 8,242,364 B1
(45) Date of Patent: Aug. 14, 2012

(54) ELECTRICAL COVER PLATE

(75) Inventors: Marcus J. Shotey, Scottsdale, AZ (US);
Richard L. Cleghorn, Tempe, AZ (US);
Jeffrey P. Baldwin, Phoenix, AZ (US)

(73) Assignee: Hubbell Incorporated, Shelton, CT (US)

( * ) Notice: Subject to any disclaimer, the term of this patent is extended or adjusted under 35 U.S.C. 154(b) by 249 days.

(21) Appl. No.: 12/724,338

(22) Filed: Mar. 15, 2010

Related U.S. Application Data

(63) Continuation-in-part of application No. 11/466,756, filed on Aug. 23, 2006, now Pat. No. 7,686,257, and a continuation-in-part of application No. 11/295,821, filed on Dec. 6, 2005, now Pat. No. 7,119,278, which is a continuation of application No. 10/966,546, filed on Oct. 15, 2004, now Pat. No. 6,977,342, which is a continuation-in-part of application No. 10/853,925, filed on May 25, 2004, now Pat. No. 7,074,078, which is a continuation of application No. 10/283,586, filed on Oct. 29, 2002, now Pat. No. 6,761,582, which is a continuation of application No. 09/351,761, filed on Jul. 12, 1999, now Pat. No. 6,511,343, which is a continuation of application No. 08/775,382, filed on Dec. 30, 1996, now Pat. No. 5,965,846.

(60) Provisional application No. 61/160,118, filed on Mar. 13, 2009, provisional application No. 60/710,979, filed on Aug. 23, 2005, provisional application No. 60/803,973, filed on Jun. 5, 2006.

(51) Int. Cl.
*H02G 3/14* (2006.01)

(52) U.S. Cl. ............... 174/66; 174/67; 174/57; 220/241; 220/242; 439/536

(58) Field of Classification Search .................. 174/66, 174/67, 53, 57, 58, 481, 480, 50; 220/3.2–3.9, 220/4.02, 241, 242; 439/535, 536, 537; D8/353; D13/177
See application file for complete search history.

(56) References Cited

U.S. PATENT DOCUMENTS

| | | |
|---|---|---|
| 1,952,719 A | 3/1934 | Lewin |
| 3,189,212 A * | 6/1965 | Bellek ............................. 174/67 |
| 3,437,737 A | 4/1969 | Wagner |
| 3,437,738 A | 4/1969 | Wagner |

(Continued)

FOREIGN PATENT DOCUMENTS

EP 0744805 B1 11/1996

OTHER PUBLICATIONS

Author: Cooper Wiring Devices; Title of Article: New G-Tool to Assure Alignment of Multi-Gang Installations; Title of the Item: press release from website; pp. 2.

(Continued)

*Primary Examiner* — Angel R Estrada
(74) *Attorney, Agent, or Firm* — Booth Udall, PLC

(57) ABSTRACT

Implementations of an electrical cover plate assemblies feature a frame having at least one adapter plate recess in a finished surface, the adapter plate recess comprising an electrical device aperture and at least one adapter coupling aperture through the frame such that the electrical device aperture is recessed with respect to the finished surface, at least one adapter plate configured to couple directly to the frame, and a door hingedly coupled to the adapter plate.

27 Claims, 9 Drawing Sheets

U.S. PATENT DOCUMENTS

| | | | |
|---|---|---|---|
| 3,571,548 A | | 3/1971 | Osika |
| 3,953,933 A | | 5/1976 | Goldstein |
| 4,017,137 A | | 4/1977 | Parks |
| 4,228,317 A | | 10/1980 | Cziment |
| 4,998,635 A | | 3/1991 | Vink et al. |
| 5,178,350 A | | 1/1993 | Vink et al. |
| 5,430,253 A | * | 7/1995 | Pratt ............................... 174/67 |
| 5,627,340 A | * | 5/1997 | Smith et al. ..................... 174/53 |
| 5,744,750 A | | 4/1998 | Almond |
| 5,898,130 A | | 4/1999 | Tansi et al. |
| 5,961,345 A | | 10/1999 | Finn et al. |
| 5,965,846 A | | 10/1999 | Shotey et al. |
| 6,207,899 B1 | * | 3/2001 | Gillespie ......................... 174/66 |
| 6,265,662 B1 | * | 7/2001 | Riedy et al. ..................... 174/67 |
| 6,281,438 B1 | | 8/2001 | Desilets et al. |
| 6,384,354 B1 | | 5/2002 | Shotey et al. |
| 6,570,091 B1 | | 5/2003 | Kesler et al. |
| 6,616,005 B1 | | 9/2003 | Pereira et al. |
| 6,642,453 B2 | | 11/2003 | Shotey et al. |
| 6,901,779 B2 | | 6/2005 | Magee et al. |
| 6,977,342 B1 | | 12/2005 | Shotey et al. |
| 7,067,737 B2 | | 6/2006 | Mallen |
| 7,122,740 B2 | | 10/2006 | Xu et al. |
| 7,129,413 B1 | * | 10/2006 | Rao et al. ........................ 174/66 |
| 7,276,662 B2 | * | 10/2007 | Drane ............................. 174/66 |

OTHER PUBLICATIONS

Author: NO MORE SCREWS.COM; Title of Article: Installing the Cheetah Speed System; Title of the Item: webpage; pp. 1.

\* cited by examiner

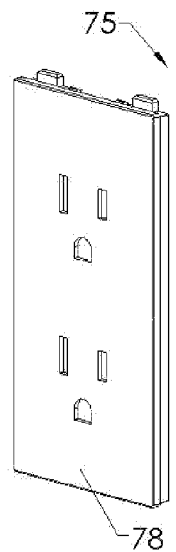
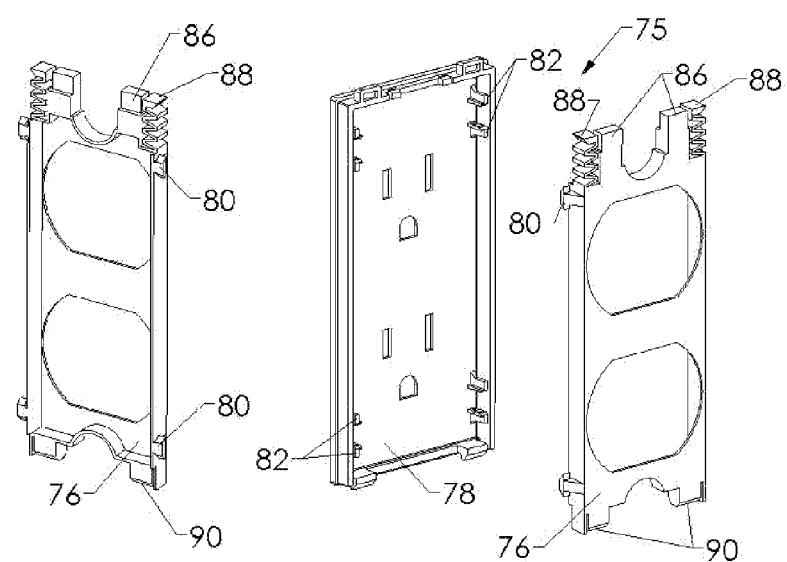
FIG. 16a
FIG. 16b
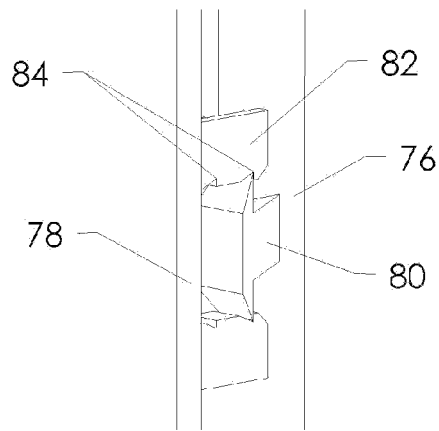
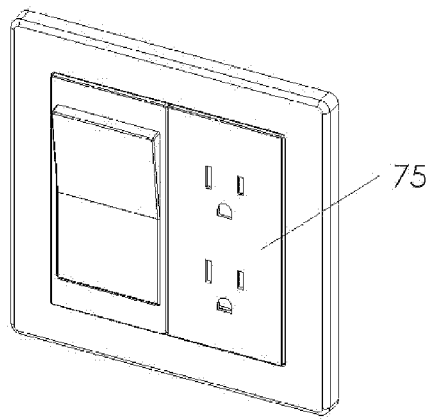
FIG. 17a
FIG. 17b

ELECTRICAL COVER PLATE

CROSS REFERENCE TO RELATED APPLICATIONS

The present application is a continuation-in-part of application Ser. No. 11/466,756, filed Aug. 23, 2006 now U.S. Pat. No. 7,683,257, which claims the benefit of the filing date of U.S. Provisional Patent Application 60/710,979, which was filed on Aug. 23, 2005 and U.S. Provisional Patent Application 60/803,973, which was filed on Jun. 5, 2006. The above-referenced application Ser. No. 11/466,756 is also a continuation-in-part of a patent application by Shotey, et al. entitled "RECEPTACLE-MOUNTED COVER PLATE TO HIDE ELECTRICAL SOCKET FACE," Ser. No. 11/295,821, filed on Dec. 6, 2005 and issued on Oct. 10, 2006 as U.S. Pat. No. 7,119,278, which is a continuation of a patent application by Shotey, et al. entitled "RECEPTACLE-MOUNTED COVER PLATE TO HIDE ELECTRICAL SOCKET FACE," Ser. No. 10/966,546, filed on Oct. 15, 2004 and issued on Dec. 20, 2005 as U.S. Pat. No. 6,977,342, which is a continuation-in-part of patent application by Shotey, et al. entitled "RECEPTACLE-MOUNTED COVER PLATE TO HIDE ELECTRICAL SOCKET FACE," Ser. No. 10/853,925, filed on May 25, 2004 and issued on Jul. 11, 2006 as U.S. Pat. No. 7,074,078, which is a continuation of patent application by Shotey, et al. entitled "RECEPTACLE-MOUNTED COVER PLATE TO HIDE ELECTRICAL SOCKET FACE", Ser. No. 10/283,586, filed Oct. 29, 2002 and issued on Jul. 13, 2004 as U.S. Pat. No. 6,761,582, which is a continuation of patent application by Shotey et al. entitled "RECEPTACLE-MOUNTED COVER PLATE TO HIDE ELECTRICAL SOCKET FACE", Ser. No. 09/351,761, filed Jul. 12, 1999 and issued on Jan. 28, 2003 as U.S. Pat. No. 6,511,343, which is a continuation of patent application by Shotey, et al. entitled "RECEPTACLE-MOUNTED COVER PLATE TO HIDE ELECTRICAL SOCKET FACE," Ser. No. 08/775,382, filed Dec. 30, 1996 and issued on Oct. 12, 1999 as U.S. Pat. No. 5,965,846, the relevant disclosures of all of these patents and applications are hereby incorporated herein by reference. The present application also claims the benefit of the filing date of U.S. Provisional Patent Application 61/160,118, which was filed on Mar. 13, 2009, the disclosure of which is hereby incorporated herein by reference.

BACKGROUND

1. Technical Field

Aspects of this document relate generally to covers for electrical devices.

2. Background Art

Conventionally, to cover the exposed sides and wiring attached to electrical devices installed in electrical boxes, an electrical cover plate that includes openings that permit the exposed faces of the electrical devices is used. Removable tabs have been used to permit conversion of electrical device covers from one type to another, an example of which is shown and described in U.S. Pat. No. 6,642,453 to Shotey, et al. (issued Nov. 4, 2003) titled "Convertible electrical device cover and method for installing same," the disclosure of which is hereby incorporated herein by reference. Since changing of the colors of electrical devices once installed (particularly switches) generally requires removing and reinstalling new electrical devices of the desired color, methods for covering the exposed surfaces of installed electrical devices such as switches have been devised, examples of which are shown are described in U.S. Pat. No. 6,384,354 to Shotey, et al. (issued May 7, 2002) titled "Cover for electrical switch," the disclosure of which is hereby incorporated herein by reference. Also, various methods for quickly attaching an electrical device cover to an electrical device box have been sold by companies such as Lamson and Sessions, Inc. of Cleveland, Ohio under the Carlon brand and Cheetah USA Corp. of Salt Lake City, Utah.

SUMMARY

In one aspect, an electrical cover plate assembly comprises a frame having a finished surface and at least one adapter plate recess in the finished surface, the adapter plate recess comprising an electrical device aperture and at least one adapter coupling aperture through the frame such that the electrical device aperture is recessed with respect to the finished surface. The device further comprises at least one adapter plate configured to couple directly to the frame, the at least one adapter plate comprising at least one projection extending from a surface of the adapter plate on each of at least two opposing sides of the adapter plate and arranged to align with and extend into adapter coupling apertures in the adapter plate recess and a door hingedly coupled to the adapter plate. In particular implementations, the adapter plate may surround the door when the door is closed on the adapter plate.

Particular implementations of the electrical cover plate assembly include a door pin hinge that couples via a pin to an adapter pin hinge on the adapter plate. The door may further comprise a first clasp latch that is configured to interface with a recess in the frame such that when the first clasp latch is engaged, the first clasp latch must be disengaged to move the door. This clasp latch may be spring biased to a latched position. The device may further comprise a second clasp latch wherein both the first and second clasp latch must be disengaged to open the door.

In some implementations, the door may further comprises a first magnetic surface wherein the adapter plate recess further comprises an opposing magnet configured to interface with the first magnetic surface. The door may further comprise a metallic plate wherein the adapter plate recess further comprises a magnet, and wherein the metallic plate is configured to interface with the magnet. The door may be configured to automatically close.

In some implementations, the device may further comprise a spring coupled to a door pin hinge such that the spring is configured to provide a closing force to the door. The device may comprise a second door or more than one set of hinge holes through which a hinge pin may pass.

In another aspect, an electrical cover plate assembly comprises a frame having at least one adapter plate recess in a finished surface, the adapter plate recess comprising an electrical device aperture and at least one adapter coupling aperture through the frame such that the electrical device aperture is recessed with respect to the finished surface, at least one adapter plate configured to couple directly to the frame, and a door hingedly coupled to the adapter plate.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 16a is a front exploded perspective view of a shell and spacer plate;

FIG. 16b is a rear exploded perspective view of a shell and spacer plate;

FIG. 17a is a front detail perspective view of a set of projections and slots on a shell coupled with a tab on a spacer plate;

FIG. 17b is a front perspective view of a frame with an installed shell and spacer plate for a duplex receptacle which shows the co-planar exposed faces of a rocker switch and duplex receptacle;

DESCRIPTION

This disclosure, its aspects and implementations, are not limited to the specific components or assembly procedures disclosed herein. Many additional components and assembly procedures known in the art consistent with the intended electrical cover plate and/or assembly procedures for an electrical cover plate will become apparent for use with implementations of an electrical cover plate from this disclosure. Accordingly, for example, although particular frames, adapter plates, electrical devices, and non-electrically powered structures are disclosed, such devices and structures and their implementing components may comprise any shape, size, style, type, model, version, measurement, concentration, material, quantity, and/or the like as is known in the art for such devices and structures and their implementing components, consistent with the intended operation of an electrical cover plate.

Structure

Figure 1A:
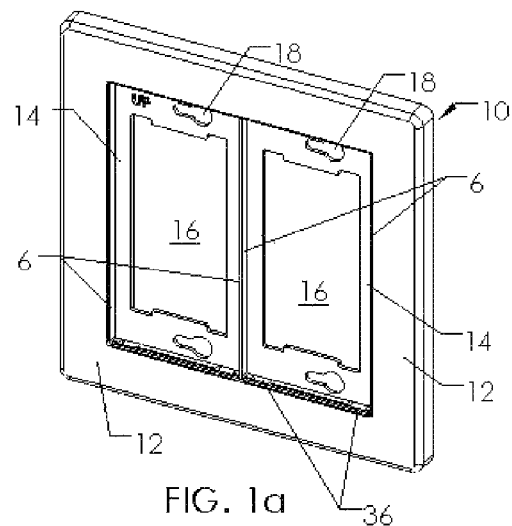
FIG. 1a is a front perspective view of a frame.
Figure 1B:
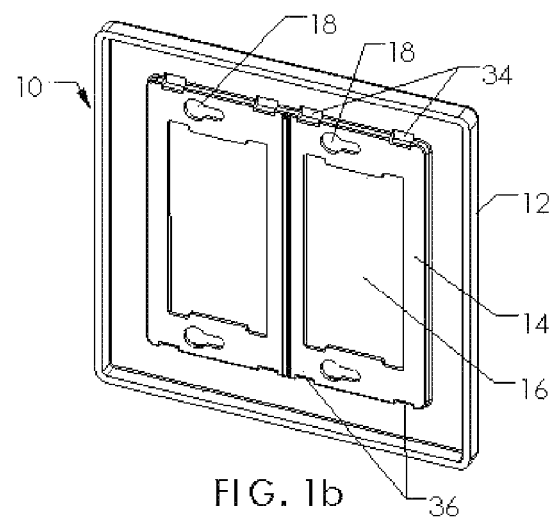
FIG. 1b is a rear perspective view of a frame.

Referring to FIGS. 1a and 1b, a frame 10 for an electrical cover plate is illustrated. The frame 10 includes a "finished surface" 12 that is the surface visible when the frame 10 is installed on an electrical device. As used herein, "finished" is intended to mean and include the final part that is visible when the assembly is completed. Nothing else is needed over the finished surface of the frame in FIG. 1a; it is complete and intended to be used and displayed without any other covering over that portion. The frame 10 also includes an adapter recess 14 which includes an electrical device aperture 16 and at least one box mounting screw aperture 18. The extents 6 of the adapter recess 14 are the side walls surrounding it and forming the recess. The frame 10 shown in FIGS. 1a and 1b shows that the box mounting screw apertures 18 may be keyhole slot apertures. Although other box mounting screw apertures may be used, keyhole slot apertures make installation of the frame 10 faster and easier than fully removing the box mounting screws from the electrical box prior to installation.

Figure 2:
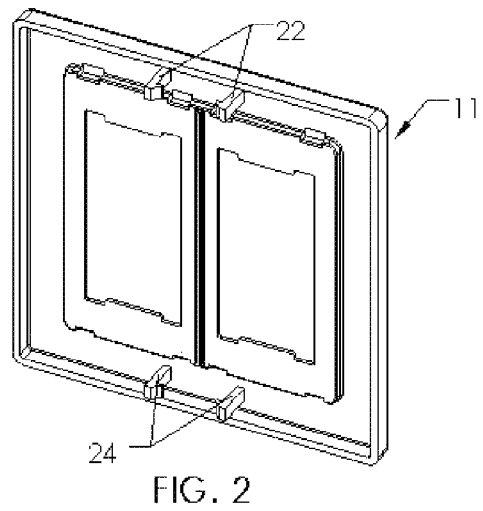
FIG. 2 is a perspective view of a frame with mounting prongs.

Although it is considered that in most cases a conventional electrical box, such as a conventional "blue box" manufactured by Lamson and Sessions, Inc. of Cleveland, Ohio under the Carlon brand, the frame may be adapted to couple with other custom electrical boxes. The electrical boxes manufactured by Cheetah USA Corp. of Salt Lake City, Utah is one example of an alternative box design to which the various frame implementations shown and described in this disclosure may be adapted. Referring to FIG. 2, a frame 11 is shown with mounting prongs 22, 24 configured to couple with correspondingly adapted or formed apertures in the electrical box. The use of mounting prongs 22, 24 coupled with apertures in an electrical box removes the need to use conventional box mounting screws used for installing electrical devices into the box to fasten the frame 11 to the box. Other quick-connect box designs are also on the market that allow a cover to be quickly installed onto an electrical box. Those of ordinary skill in the art will readily understand how to adapt the disclosed frame implementations to differing electrical box connections without undue experimentation.

Figure 3A:
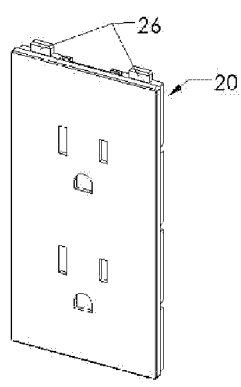
FIG. 3a is a front perspective view of an adapter plate.
Figure 3B:
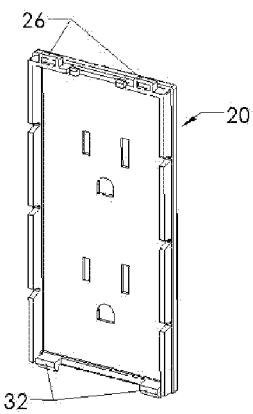
FIG. 3b is a rear perspective view of an adapter plate.
Figure 4A:
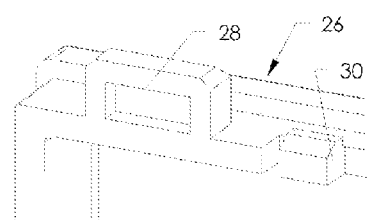
FIG. 4a is a detail view of an adapter plate catch mechanism.
Figure 4B:
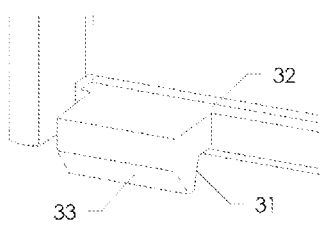
FIG. 4b is a detail view of an adapter plate pawl.
Figure 5A:
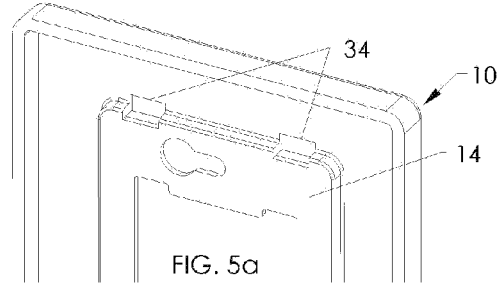
FIG. 5a is a detail view of the adapter plate catch mechanism when the adapter plate is coupled with the frame.
Figure 5B:
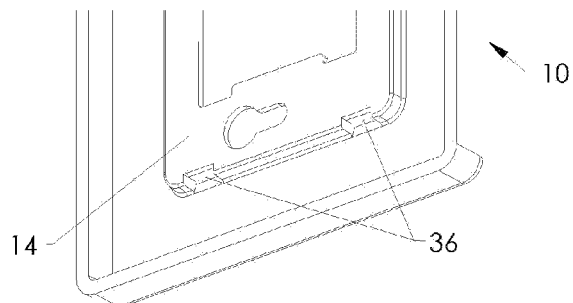
FIG. 5b is a detail view of the adapter plate pawl when the adapter plate is coupled with the frame.

FIGS. 3a and 3b illustrate front and rear views of an implementation of an adapter plate 20 sized and shaped to fit at least partially into the adapter plate recess 16 of the frame 10 is illustrated. The adapter plate 20 of this particular implementation includes two catch mechanisms 26 on an upper edge and two pawls 32 on a lower, opposing edge. As illustrated more closely in the close-up view of FIG. 4a, the catch mechanism 26 of this implementation includes a catch 28 and a spring element 30. The spring element 30 is configured to maintain a bias against the frame 10 when the adapter plate 20 is coupled to the frame 10. Referring to FIG. 4b, a pawl 32 is illustrated for this implementation. The pawl 32 includes angled surfaces on two of its faces 31 and 33. The angled faces 31 and 33 assist in respectively removing and inserting the adapter plate 20. The pawls 32 and catch mechanisms 26 may couple to the frame 10 at an adapter plate recess 14 through coupling apertures 34 and 36 (see FIGS. 1b, 5a, and 5b). FIGS. 5a and 5b illustrate close-up views of the relationship between an implementation of the adapter plate recess 14, the coupling apertures 34 and 36, and the respective catch mechanism 26 and pawl 32.

Figures 6A, 6B:
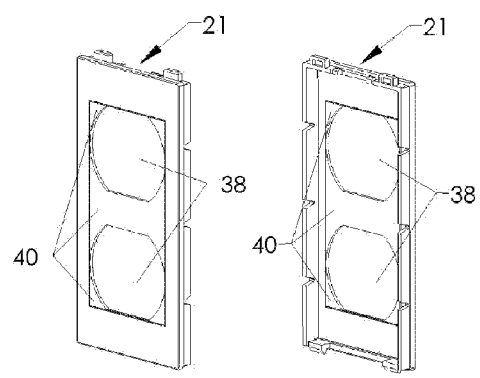
FIG. 6a is a front perspective view of a blank adapter plate with removable tabs for duplex and ground fault circuit interrupter receptacles.
FIG. 6b is a rear perspective view of a blank adapter plate with removable tabs for duplex and ground fault circuit interrupter receptacles.

FIGS. 6a and 6b illustrate a front and rear view of an implementation of an adapter plate 21 with removable tab sets 38, 40. The adapter plate 21 of this implementation is initially configured as a "blank" having no openings configured to accommodate an electrical device face. Among other uses, blank adapter plates may be useful for childproofing electrical devices. Blank adapter plates adapted for childproofing applications may also include plug blade apertures that are initially closed with a layer of stationary or moveable plastic, but can be made open such as through mechanical movement known in childproofing cover art or being penetrated through insertion of plug blades through a thin film of plastic over each of the plug blade apertures of the adapter plate.

Depending on whether the electrical device to be accommodated is a duplex or ground fault current interrupter (GFCI) receptacle for this implementation, either of the removable tab sets 38, 40 may be removed to allow access to the face of the receptacle. The particular implementation illustrated in FIGS. 6a and 6b also shows that the adapter plate 21 is designed to expose the face of the receptacle, while the particular implementation illustrated in FIGS. 3a and 3b is designed to conceal the face of the receptacle while providing access through plug blade apertures to corresponding plug blade apertures in an electrical device behind the adapter plate 20. Particular implementations may also include adapter plates designed to conceal part of an electrical device while providing removable tabs for exposing another part of the device (such as a reset button on a ground fault circuit interrupter (GFCI) device) if so desired.

Figure 7:
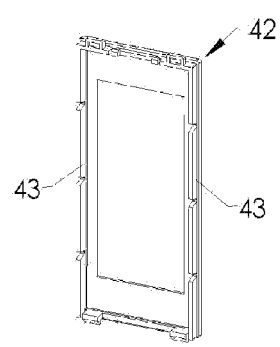
FIG. 7 is a front perspective view of an adapter plate for a decora style receptacle.

Another particular implementation of an adapter plate 42 is illustrated in FIG. 7. For certain types of electrical devices, known as "decorator-style" or "decora-style" devices, the device face is a large rectangle. In combination with the frame 10 implementation of FIGS. 1a and 1b, the device face of a decora-style device will fill much of the electrical device aperture 16 in the frame 10 leaving only a small space in the adapter plate recess 14 along two of its edges. This is illustrated best in the implementations shown in FIGS. 14, 15, 18 and 20. To permit the adapter plate 42 to fit over a decora-style receptacle, two thin sides 43 are used to connect the top part of the adapter plate 42 to its lower portion. These thin sides 43 fill the remaining space in the adapter plate recess 14 at least up to an edge of the electrical device aperture 16 within the limits of any space required to ensure the receptacle and the adapter plate 42 will be able to be inserted and removed.

Figures 8A, 8B, 10A:
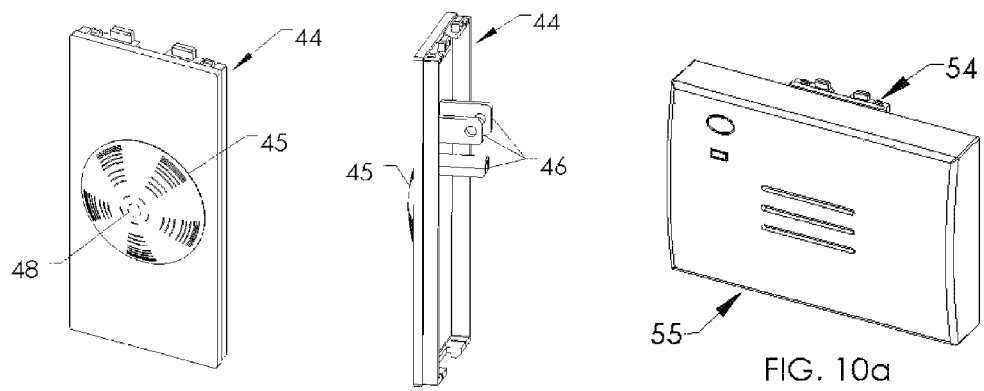
FIG. 8a is a front perspective view of a nightlight adapter plate.
FIG. 8b is a rear perspective view of a nightlight adapter plate.
FIG. 10a is a front perspective view of an adapter plate carbon monoxide sensor.

FIGS. 8a through 10b illustrate various examples of electrical devices coupled to adapter plates for mounting in an implementation of a disclosed frame. For some of these examples, the electrical devices are coupled permanently to the adapter plate (in some cases even coupled by forming integrally with the adapter plate). FIGS. 8a and 8b illustrate front and rear views of a night light 45 or emergency light 45 implementation coupled to an adapter plate 44. Although the implementation shown indicates that it may be plugged into a receptacle behind the adapter plate, by adapting the design to be battery powered, the light implementation may be used within a adapter plate recess regardless of whether there is a powered receptacle within the recess or not. FIG. 8a shows the front face of the adapter plate 44 which may be flat or nearly flat with a place for light from the nightlight 45 to escape. FIG. 8b illustrates the rear of the adapter plate 44 which includes prongs 46 that fit into an electrical receptacle covered by the adapter plate 44 and the light bulb 48 within the nightlight. As an alternative to a light bulb 48, other lighted films and electroluminescent materials may be used. These are common in the art of nightlights. One example is the Indiglo® material. The prongs 46 are inserted into the receptacle when the adapter plate 44 is inserted into the frame 10 thus powering the nightlight 45.

Figures 9A, 9B, 10B:
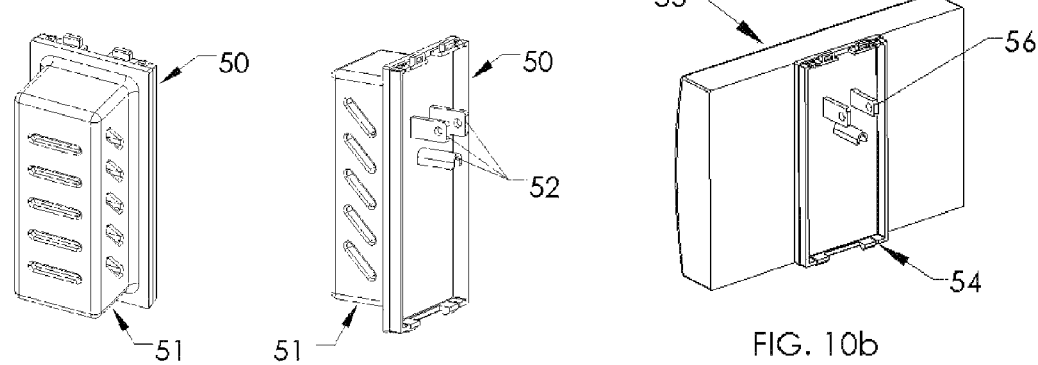
FIG. 9a is a front perspective view of an air freshener adapter plate.
FIG. 9b is a rear perspective view of an air freshener adapter plate.
FIG. 10b is rear perspective view of an adapter plate carbon monoxide sensor.

FIGS. 9a and 9b illustrate another particular implementation of an adapter plate 50 which includes an air freshener 51. The air freshener 51 is attached to the adapter plate 50 and a set of prongs 52 is attached to the rear of the adapter plate 50 illustrated in FIG. 10b to provide power to the air freshener. Like the nightlight 45, the air freshener may receive power from a receptacle when the adapter plate 50 is inserted into the frame 10, or may be adapted for battery or other power. Similarly, referring to FIGS. 10a and 10b, an adapter plate 54 implementation that includes a carbon monoxide sensor 55 is illustrated. The adapter plate 54 can best be seen in FIG. 11b, which also shows the prongs 56 that connect the carbon monoxide sensor 55 to power when the adapter plate 54 is inserted into a frame 10 over a receptacle.

The use of an adapter plate 44, 50, and 54 implementation like those shown in FIGS. 8a to 10b for electrically powered devices may help ensure these devices are not easily removable and may add to the convenience, improve the aesthetic appearance, and improve the safety performance of these devices while they are in use. While electrical devices that are connected directly to power through a receptacle have been illustrated in FIGS. 8a-10b, electrical devices that are powered by batteries and do not require a power connection may be included in particular implementations. Those of ordinary skill in the art will readily understand how to modify various electrical devices for use with an adapter plate to secure the device to the wall plate frame from the disclosure provided herein.

Figures 11A, 11B:
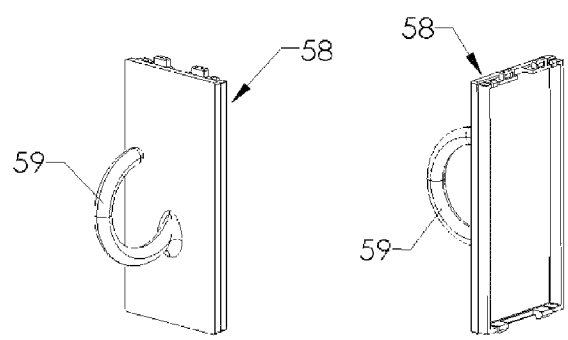
FIG. 11a is a front perspective view of an adapter plate keychain hook.
FIG. 11b is a rear perspective view of an adapter plate keychain hook.

FIGS. 11a and 11b show a particular implementation of an adapter plate 58 that includes a non-electrically powered device. The particular device shown in FIGS. 11a and 11b is a hook 59 for a key chain or pet leash. Because the hook does not require electrical power, the adapter plate 58 can be installed in an adapter recess 14 in a frame 10 that does not have the electrical device aperture 16 filled by an installed electrical device. Alternatively, the adapter plate 58 can be installed over any electrical device that does not protrude above the finished surface 12 of the frame 10 (for example, a receptacle) if the adapter plate 58 is appropriately configured for the device behind it.

The principle of using an adapter plate that incorporates electrically or non-electrically powered devices can be extended to cover particular implementations of adapter plates intended to convert a universal electrical device that is configured to mount within a standard rocker switch or duplex outlet space in an electrical box from one device type to another. For example, an adapter plate configured with an interface that causes the universal electrical device to act as a toggle switch may initially be installed within the frame. If the user desires to remove the switch and replace it with a rocker switch interface, the toggle switch adapter plate can be removed and replaced with an adapter plate designed to convert the device to act as a rocker switch. Other implementations where the universal electrical device can be caused to operate as an electrical receptacle instead of a switch, for example, simply by exchanging appropriately configured adapter plates are contemplated.

Figure 12:
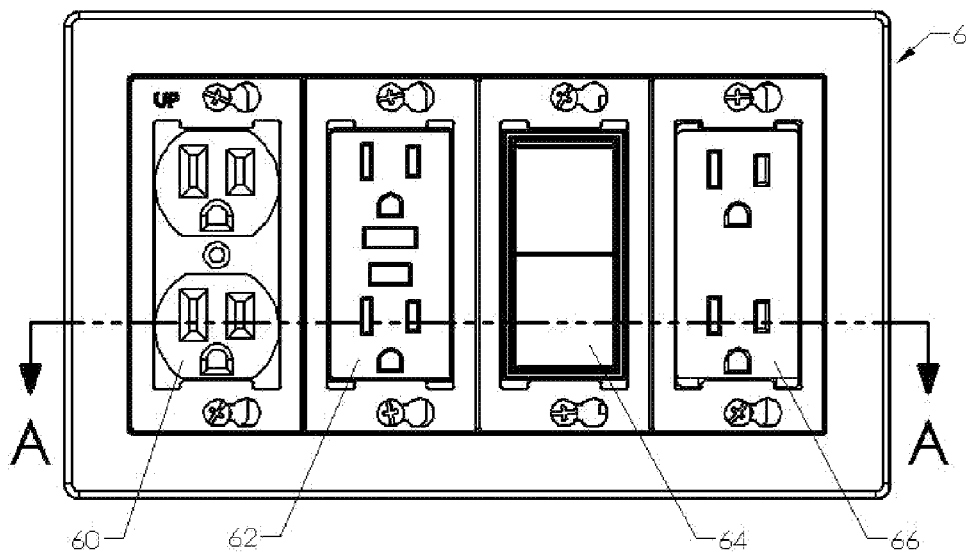
FIG. 12 is a front view of a four gang frame fastened to four electrical devices.
Figure 13:
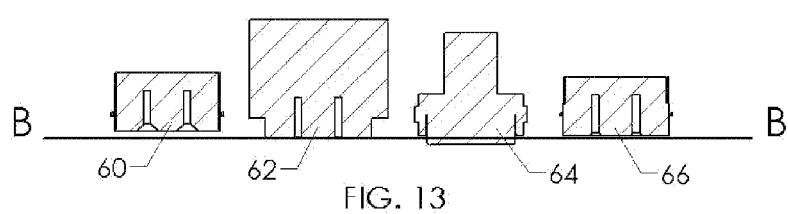
FIG. 13 is a cross section view taken along sectional line A in FIG. 12.

FIG. 12 illustrates a particular implementation of a four gang frame 6 that includes four different electrical devices, a duplex receptacle 60, a GFCI receptacle 62, a rocker switch 64, and a decora-style receptacle 66. Referring FIG. 13, a cross section view along the sectional line A of FIG. 12 is shown with the frame removed but a reference line B shown which indicates that the duplex receptacle 60 is recessed relative to a reference line B level with the face of the GFCI receptacle 62. The rocker switch 64 protrudes above the reference line 61 and the decora-style receptacle 66 is slightly recessed. Since the exposed faces of the electrical devices are not at the same level, their surfaces will not be co-planar if a conventional four gang electrical cover plate were installed.

Figure 14:
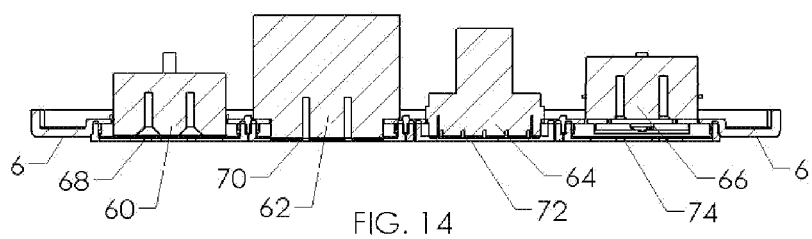
FIG. 14 is a cross section view taken along sectional line A in FIG. 12 when varying thickness adapter plates have been installed over the electrical devices of FIG. 12 showing the co-planar faces of the adapter plates.
Figure 15:
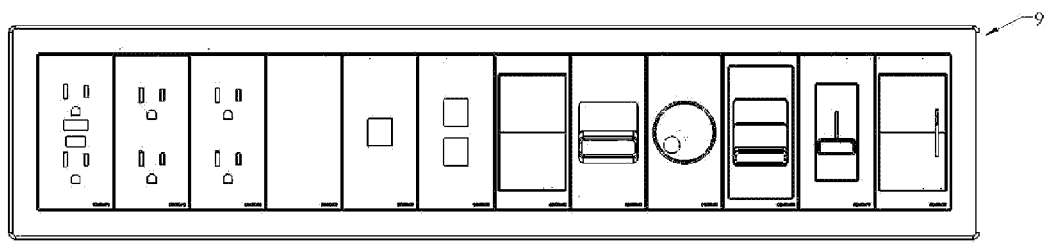
FIG. 15 is a front view of sixteen varying thickness adapter plates installed over different electrical devices defining a single co-planar surface.

Referring to FIG. 14, the viewable surface of the finished cover plate for the electrical devices can be rendered co-planar by the use of adapter plates 68, 70, 72, and 74 which each vary in their thickness corresponding to the type of electrical device they conceal or with which they interface. For example, the portion of the adapter plate 68 that conceals the duplex receptacle 60 will need to be thicker than the portion of the adapter plate 70 that conceals the GFCI receptacle 62 so that the exposed surfaces of the adapter plates 68 and 70 are co-planar. FIG. 14 illustrates the co-planar exposed surfaces of the adapter plates 68, 70, 72, and 74 when installed over the electrical devices. The principle of varying the thickness of an adapter plate used to cover a particular electrical device type can permit a wide variety of different electrical devices to be rendered co-planar. Using conventional systems, co-planar implementations for differing device types was not possible. Referring to FIG. 15, sixteen (16) different electrical device adapter plates are shown mounted in a single frame 9, all with exposed surfaces rendered co-planar by the use of an adapter plate of a corresponding thickness. FIG. 15 also illustrates a plurality of different implementations for adapter plates that may be configured for virtually any type of electrical device. Only a limited number of examples is provided here due to the endless possibilities available. Many other implementations will become apparent from the disclosure provided here.

Another particular implementation of an adapter plate 75 is illustrated in FIGS. 16a and 16b. The adapter plate 75 can be composed of a spacer plate 76 and a shell 78. The spacer plate 76 of this implementation includes a plurality of tabs 80 which couple with a plurality of projections 82 from the shell 78. The tabs 80 and the projections 82 permit the spacer plate 76 and the shell 78 to become an adapter plate 75 which can then be installed into a frame, such as frame 10 shown in FIG. 1a. To permit the adapter plate 75 to couple with the apertures 34, 36 in the frame 10 for installation of the adapter plate 75, a first prong 86 and a spring member 88 may be included at the upper side of the spacer plate 76. On the opposing side of the spacer plate 76 a second prong 90 may be included. The first and second prongs 86 and 90 fit into the apertures 34, 36 in the frame 10 when the adapter plate 75 is installed.

Referring to FIG. 17a, coupling of the spacer plate 76 and the shell 78 may be accomplished by providing a plurality of slots 84 in the projections 82 attached to the shell 78. In the particular implementation shown in FIG. 17a, two sets of slots 84 are provided, which allow the spacing between the shell 78 and the spacer plate 76 to be adjusted, depending on which set of slots 84 the tabs 80 are currently engaged in. FIG. 17b illustrates how by using the slots 84 and the tabs 80 to set the distance between the shell 78 and the spacer plate 76, the exposed surface of the adapter plate 75 may be rendered co-planar with the exposed surface of an adjoining electrical device, in this case, a rocker switch. While the particular implementation of an adapter plate 75 has shown two sets of slots 84, other particular implementations may include only one set of slots 84 so that the distance between the shell 78 and the spacer plate 76 is fixed.

Use.

Figure 18:
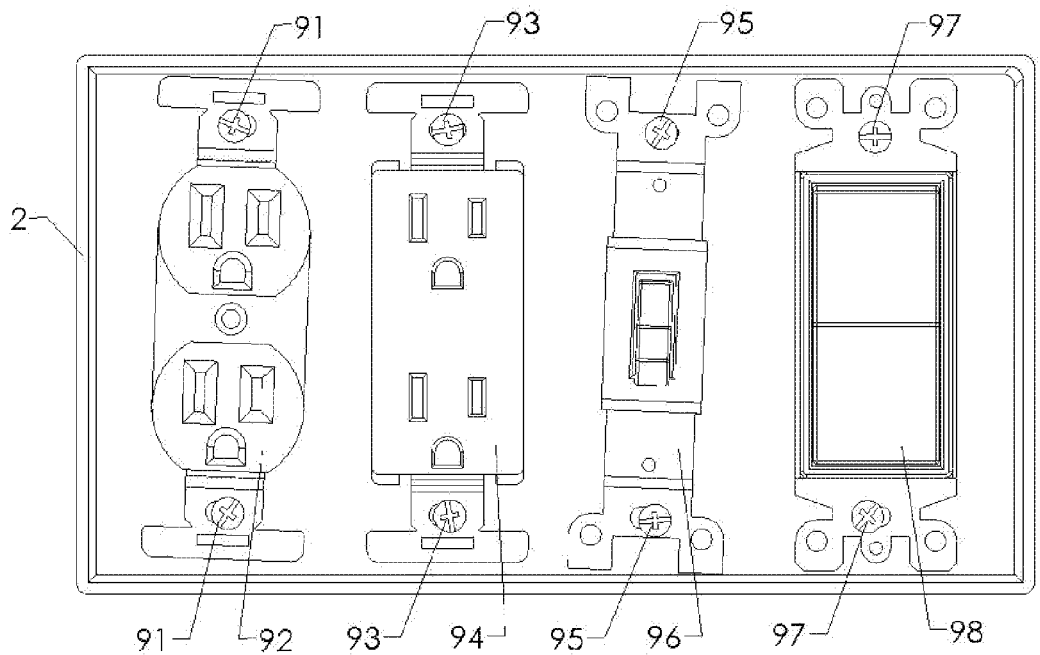
FIG. 18 is a front view of four different electrical devices installed in an electrical box showing that the devices are not aligned with one another.
Figure 19:
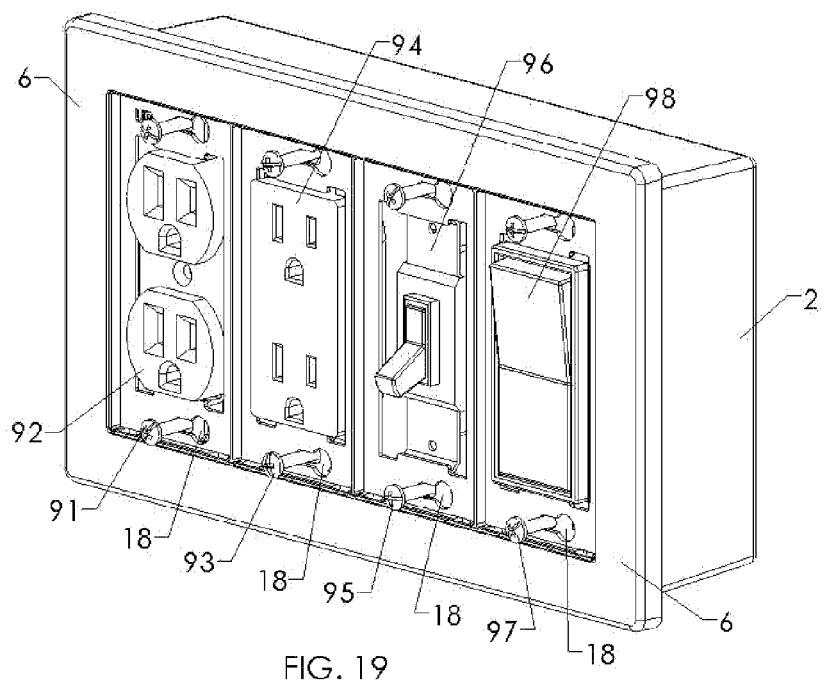
FIG. 19 is a perspective view of a four gang frame inserted over the devices with screws extending through but not tightened in the keyhole box mounting screw apertures of the frame and the devices aligned by the edges of the electrical device apertures.

Referring to FIG. 18, four different electrical devices 92, 94, 96, and 98 have been installed within an electrical box 2. As can be seen from the extreme example of FIG. 18, the four devices 92, 94, 96, and 98 are coupled loosely to the electrical box 2 through a plurality of box mounting screws 91, 93, 95 and 97, and they are not aligned with one another either vertically or horizontally. FIG. 19 shows a frame 6 placed over the four electrical devices 92, 94, 96, and 98 and coupled to the electrical box through the plurality of box mounting screws 91, 93, 95 and 97. The electrical devices 92, 94, 96, and 98 are now aligned vertically and horizontally by the electrical device apertures 16 in the frame 6. Alignment of the devices 92, 94, 96, and 98 occurs automatically as the frame 6 is placed over the devices 92, 94, 96, and 98 and is coupled to the electrical box through the box mounting screws 91, 93, 95 and 97. Although box mounting screws and keyhole box mounting screw apertures are used in this particular implementation, alternative coupling methods and/or alternative box mounting screw aperture configurations may be used. The alignment feature is not dependent upon what method is used to couple the frame to the wall, electrical box or electrical device.

Figure 20:
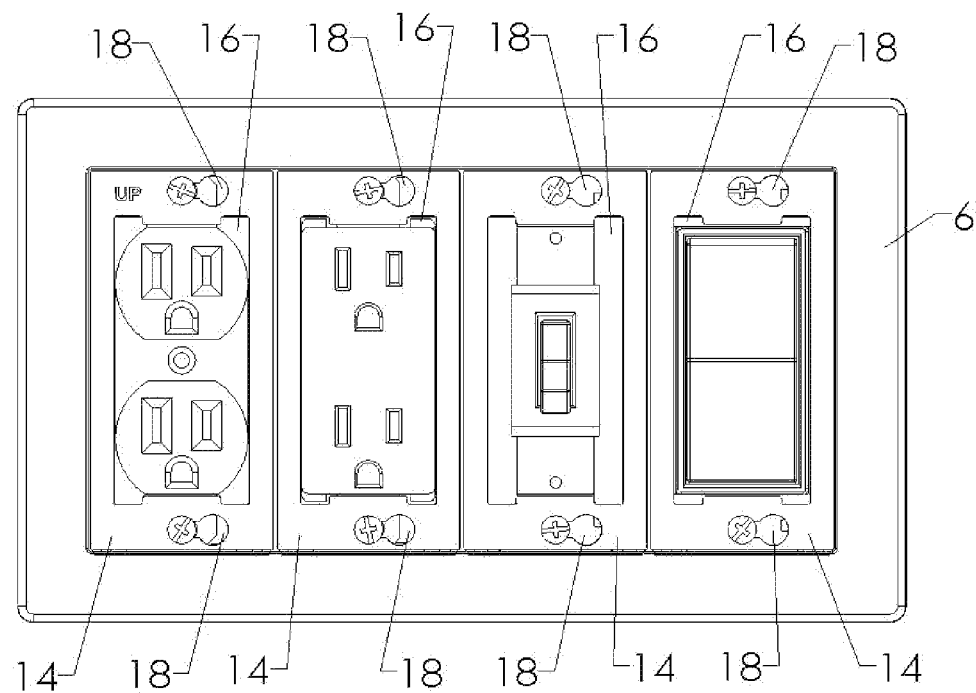
FIG. 20 is a front view of a four gang frame inserted over the devices with screws tightened in the keyhole box mounting screw apertures of the frame and the devices aligned by the edges of the electrical device apertures.
Figure 21:
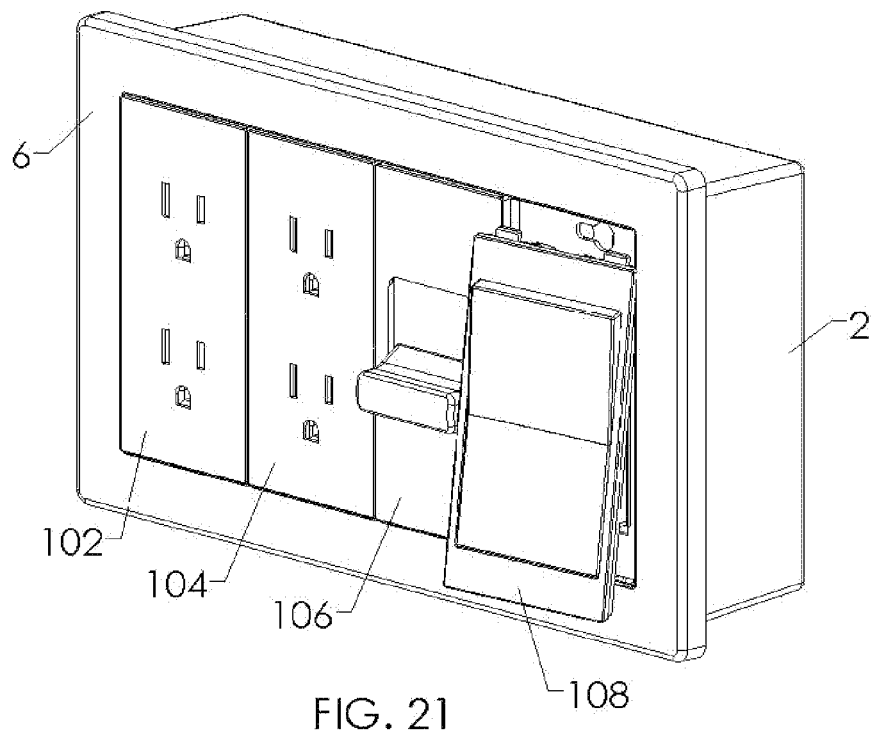
FIG. 21 is a front perspective view of a four gang frame inserted over the devices with three adapter plates installed and the fourth adapter plate in the intermediate step of being snapped into the frame.

FIG. 20 shows the frame 6 with the box mounting screws 91, 93, 95 and 97 tightened down into the box mounting screw apertures 18. FIG. 21 shows the frame 6 with three adapter plates 102, 104, 106 installed into the adapter plate recesses 14 of the frame 6. The last adapter plate 108 is shown partially inserted into the apertures 34 in the adapter plate recess 14 to illustrate how the adapter plate 106 is installed into the frame 6. Installation of the adapter plate 108 is completed by pushing the side of the adapter plate 108 that includes the pawls 32 into the apertures 36 in the adapter plate recess 14. At that point, the adapter plate 106 "snaps in" to the adapter plate recess 14 and conceals the box mounting screw apertures 18, the electrical device aperture 16 and fills the adapter plate recess 14 at least to the edge of the electrical device aperture 16. Removal of the adapter plate 106 may be accomplished by inserting a thin flat object, such as a screw driver, into the narrow gap between the adapter plate 106 and the frame 6 near the pawls 32 (FIGS. 3a-4b) and applying a prying pressure.

Other Implementations.

Figure 22:
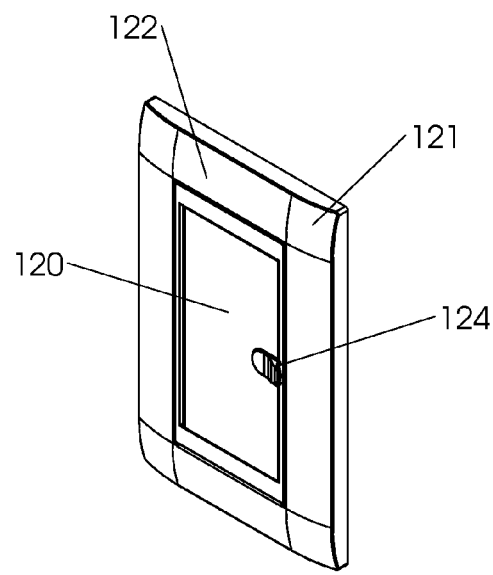
FIGS. 22-23 & 25-26 provide a side view of implementations of an adapter plate having a door in closed and open positions.
Figure 23:
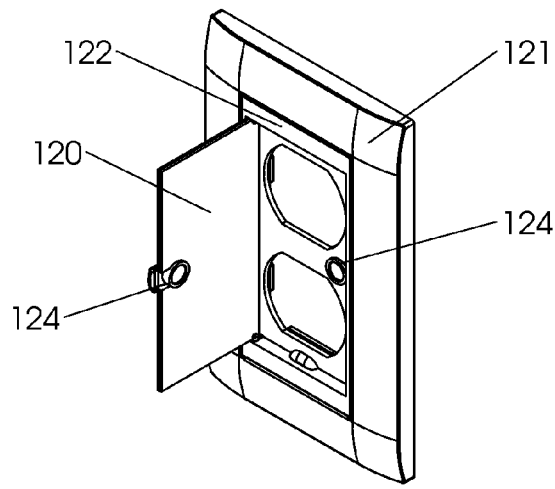
Figure 24:
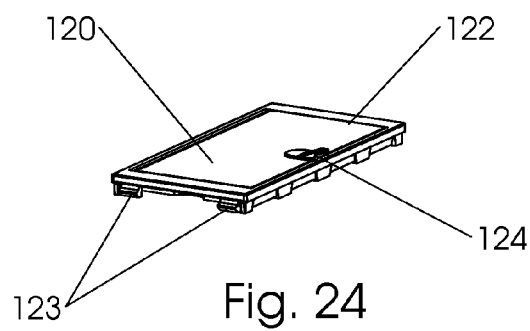
FIGS. 24 & 27 show perspective views of an adapter plate having door in a closed position.
Figure 25:
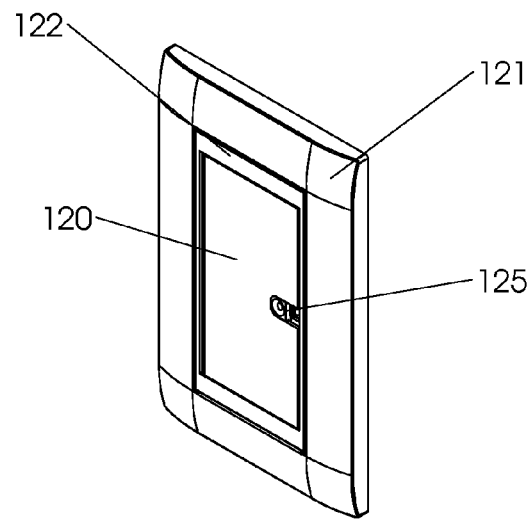
Figure 26:
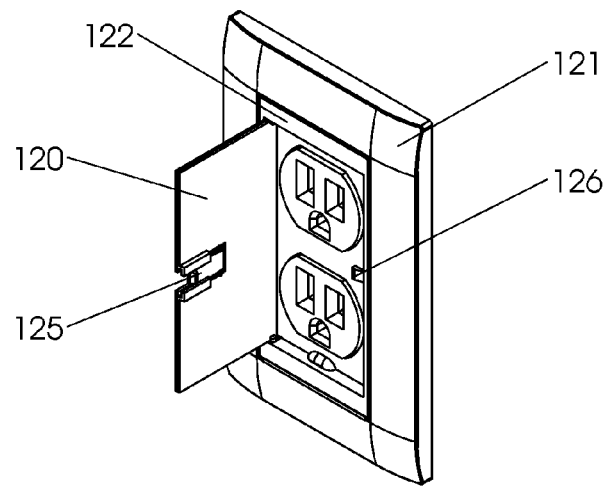
Figure 27:
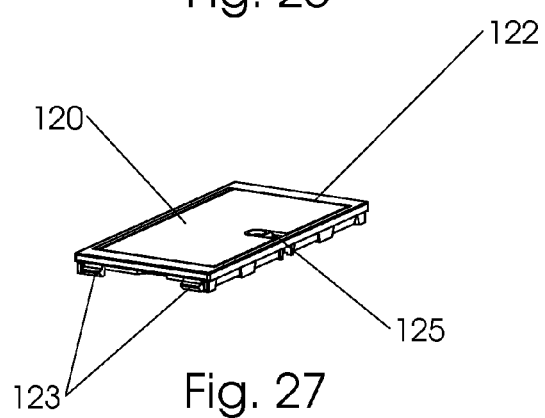

Another particular implementation of an adapter plate 122 is illustrated in FIGS. 22-24. This implementation includes a hinged door 120 on the adapter plate 122 which is directly coupled to the frame 121 by seating tabs 123 into corresponding recesses in the frame 121. As depicted, in particular implementations the door 120 is hinged along a left side, however, the door 120 may be hinged along any side of the adapter plate 122. This implementation and the adapter plate implementation illustrated in FIGS. 25-27 are contemplated to be configured like the implementations shown and described with reference to FIGS. 3, 4, 6 and 7, in the features they include to assist in engaging with the frame 121. Although a specific separate description of those engagement mechanisms is not provided here, it should be understood that the frame 121 and the adapter plate 122 may specifically include the same coordinating engagement features as the previous embodiments.

The hinge may be a simple pin hinge with pins extending from two opposing sides of the door 120 into corresponding recesses in the adapter door frame or may comprise any other type of hinge structure. In the embodiments shown in FIGS. 22-27, the adapter plate surrounds the door when the door is closed on the adapter plate, but this is not required in every embodiment and the adapter plate hinge members may extend forward of the adapter plate to hold the door hinge pins. In particular implementations, along a non-hinging side of the door 120, a magnetic or metal element 124 may be mounted to the door 120. A corresponding metal or magnetic element 124 may be mounted to the door frame so that when the door 120 is closed, the two pieces 124 attract each other to hold the door 120 closed against the frame 121. The adapter 122 surrounds and/or covers (see, e.g. FIGS. 3a and 6a) the electrical device face and in these cases, the door 120 closes over the top of the electrical device face to hide the electrical device. In particular implementations of the embodiments illustrated in FIGS. 22-27, the door may be configured with a coil spring or other bias that biases the door to its closed position. For example, the adapter plate may comprise a spring coupled to a door pin to bias the door closed. Although the particular implementations of FIGS. 22-27 are single gang examples, the adapter plate may be configured similar to the other implementations provided throughout this disclosure such that it can engage into the frame openings within any of the various multiple-gang implementations as well.

In another aspect, particular implementations, such as that illustrated in FIGS. 25-27, may comprise a clasp on the adapter door. As shown, the hinged door 120 may further comprise a moveable clasp latch 125 located along a non-hinging side of the door 120. In such implementations, the door frame 121 further comprises a corresponding recess 126 so that the moveable clasp latch 125 may extend into the recess 126 in the door frame. To open the door 120, the user slides the moveable clasp latch 125 away from the frame edge toward the center of the door 120 to unlatch the door 120. The moveable clasp latch 125 is spring biased to its latched position. The spring may be formed of metal, plastic, or any other suitable material. In other implementations, the hinged door 120 may comprise two moveable clasps that work together and move toward each other so that the user can pinch the clasps to release the latch and allow the door to open. The adapter 122 surrounds and/or covers the electrical device face and in this example, the door 120 closes over the top of the electrical device face to hide the electrical device. A rear side of the door 120 may comprise one or more recesses (not shown) to receive the socket face of the electrical outlet. In some implementations designed for child safety, the door latch may comprise a pair of door latches on adjacent opposing sides of the door so that opposing movement of the latches is required to open the door. Other forms of child safety latches may comprise other combinations of two or more movements to unlatch the door. An alternative embodiment allows for more convenient usage depending on the placement of the receptacle relative to other structures on the wall including, but not limited to, a medicine cabinet or an adjacent wall. Other embodiments may comprise two hinged doors, one for each receptacle of the electrical outlet, each door hingedly coupled to the adapter, but they may hinge to the side as in the embodiment of FIG. 23, or may hinge both at the top of the door, or one at the top of the first door and one at the bottom of the second door so that they separate when they are both open.

In some aspects of the implementation, it may be desirable to allow a user to switch the swing direction of the door. Therefore, at least second set of holes may be included in the adapter frame, but any number of sets of holes may be included. In such implementations the user may simply snap the hinge pins into the desired hinge holes. For example, the product may be packaged so that at the time of sale, the hinge is on the left side but when installed, it may be determined that it is more desirable for the door to hinge on the right side. The user may then bend or flex the door sufficiently to allow the hinge pins to be removed from the left-paired hinge holes and then reinsert the pins into the right-paired hinge holes. A similar operation may allow a user to switch the cover between top-paired hinge holes and bottom-paired hinge holes. Another alternate implementation may provide that the door automatically closes under the bias of a spring comprised of plastic, metal, or any other suitable material.

Other implementations may comprise multiple doors as it may be desirable for the user to open a first door that leads to one receptacle while the other receptacle within a duplex device remains covered by a second door. This allows the second receptacle to remain protected while the first one is in use.

Still further implementations may allow for protection of non-receptacle devices including, but not limited to switches. In these implementations, the door may include a molded shape that conforms to the basic topography of the respective device.

It will be understood that implementations are not limited to the specific components disclosed herein, as virtually any components consistent with the intended operation of a method and/or system implementation for an electrical device cover may be utilized. Accordingly, for example, although particular frames, adapter plates, electrical devices, or non-electrically powered devices may be disclosed, such components may comprise any shape, size, style, type, model, version, class, grade, measurement, concentration, material, weight, quantity, and/or the like consistent with the intended operation of a method and/or system implementation for an electrical cover plate may be used.

In places where the description above refers to particular implementations of an electrical cover plate, it should be readily apparent that a number of modifications may be made without departing from the spirit thereof and that these implementations may be applied to other electrical cover plate designs. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An electrical cover plate assembly comprising:
a frame having a finished surface and at least one adapter plate recess in the finished surface, the adapter plate recess comprising an electrical device aperture and at least one adapter coupling aperture through the frame such that the electrical device aperture is recessed with respect to the finished surface; and
at least one adapter plate configured to couple directly to the frame, the at least one adapter plate comprising at least one plug opening extending through the adapter plate, sized to allow at least one plug blade through the plug opening and configured to removably couple to the electrical device face, and at least one projection extending from a surface of the adapter plate on each of at least two opposing sides of the adapter plate and arranged to align with and extend into adapter coupling apertures in the adapter plate recess; and
a door hingedly coupled to the adapter plate and selectively covering the at least one plug opening of the adapter plate.

2. The electrical cover plate assembly of claim 1 wherein the door comprises a door pin hinge that couples via a pin to an adapter hinge member on the adapter plate.

3. The electrical cover plate assembly of claim 1 wherein the door further comprises a first clasp latch that is configured to interface with a recess in the frame such that when the first clasp latch is engaged, the first clasp latch must be disengaged to open the door.

4. The electrical cover plate assembly of claim 3 wherein the clasp latch is spring biased to a latched position.

5. The electrical cover plate assembly of claim 3 further comprising a second clasp latch wherein both the first and second clasp latch must be disengaged to open the door.

6. The electrical cover plate assembly of claim 1 wherein the door further comprises a first magnetic surface and wherein the adapter plate recess further comprises an opposing magnet configured to interface with the first magnetic surface.

7. The electrical cover plate assembly of claim 1 wherein the door further comprises a metallic plate and wherein the adapter plate recess further comprises a magnet, wherein the metallic plate is configured to interface with the magnet.

8. The electrical cover plate assembly of claim 1 wherein the door is configured to automatically close.

9. The electrical cover plate assembly of claim 8 further comprising a spring coupled to a door pin hinge such that the spring is configured to provide a closing force to the door.

10. The electrical cover plate assembly of claim 1 further comprising a second door.

11. The electrical cover plate assembly of claim 1 further comprising more than one set of hinge holes through which a hinge pin may pass.

12. The electrical cover plate assembly of claim 1, wherein the at least one plug opening comprises at least one plug opening that surrounds the electrical device and allows at least two plug blades through the plug opening to removably couple to the electrical device face.

13. The electrical cover plate assembly of claim 1, wherein the adapter plate covers the electrical device face, and wherein the at least one plug opening comprises at least two plug openings each configured to removably couple to the electrical device face.

14. An electrical cover plate assembly comprising:
a frame having at least one adapter plate recess in a finished surface, the adapter plate recess comprising an electrical device aperture and at least one adapter coupling aperture through the frame such that the electrical device aperture is recessed with respect to the finished surface; and
at least one adapter plate configured to couple directly to the frame and comprising at least one plug opening extending through the adapter plate, sized to allow at least one plug blade through the plug opening and configured to removably couple to the electrical device face; and
a door hingedly coupled to the adapter plate and selectively covering the at least one plug opening of the adapter plate.

15. The electrical cover plate assembly of claim 14 wherein the adapter plate surrounds the door when the door is closed on the adapter plate.

16. The electrical cover plate assembly of claim 14 wherein the door comprises a door pin hinge that couples via a pin to an adapter pin hinge on the adapter plate.

17. The electrical cover plate assembly of claim 14 wherein the door further comprises a first clasp latch that is configured to interface with a recess in the frame such that when the first clasp latch is engaged, the first clasp latch must be disengaged to move the door.

18. The electrical cover plate assembly of claim 17 wherein the clasp latch is spring biased to a latched position.

19. The electrical cover plate assembly of claim 17 further comprising a second clasp latch wherein both the first and second clasp latch must be disengaged to open the door.

20. The electrical cover plate assembly of claim 14 wherein the door further comprises a first magnetic surface and wherein the adapter plate recess further comprises an opposing magnet configured to interface with the first magnetic surface.

21. The electrical cover plate assembly of claim 14 wherein the door further comprises a metallic plate and wherein the adapter plate recess further comprises a magnet, wherein the metallic plate is configured to interface with the magnet.

22. The electrical cover plate assembly of claim 14 wherein the door is configured to automatically close.

23. The electrical cover plate assembly of claim 22 further comprising a spring coupled to a door pin hinge such that the spring is configured to provide a closing force to the door.

24. The electrical cover plate assembly of claim 14 further comprising a second door.

25. The electrical cover plate assembly of claim 14 further comprising more than one set of hinge holes through which a hinge pin may pass.

26. The electrical cover plate assembly of claim 14, wherein the at least one plug opening comprises at least one plug opening that surrounds the electrical device face.

27. The electrical cover plate assembly of claim 14, wherein the adapter plate covers the electrical device face, and wherein the at least one plug opening comprises at least two plug openings each configured to removably couple to the electrical device face.

\* \* \* \* \*